United States Patent [19]
Jung et al.

[11] Patent Number: 5,763,546
[45] Date of Patent: Jun. 9, 1998

[54] SOLUBLE CROSSLINKABLE COPOLYMERS BASED ON VINYL ESTER, VINYL AROMATIC AND ACRYLATE MONOMERS, PROCESSES FOR THEIR PREPARATION AND THEIR USE IN COATING AGENTS

[75] Inventors: Werner-Alfons Jung, Ascheberg; Peter Hoffmann, Münster, both of Germany

[73] Assignee: BASF Lacke+Farben, AG., Muenster-Hiltrup, Germany

[21] Appl. No.: 861,986

[22] PCT Filed: Dec. 7, 1990

[86] PCT No.: PCT/EP90/02129

§ 371 Date: Aug. 7, 1992

§ 102(e) Date: Aug. 7, 1992

[87] PCT Pub. No.: WO91/09888

PCT Pub. Date: Jul. 11, 1991

[30] Foreign Application Priority Data

Dec. 22, 1989 [DE] Germany .................. 39 42 592.4

[51] Int. Cl.⁶ .................................................. C08F 279/00
[52] U.S. Cl. .................................................. 525/313
[58] Field of Search .................. 526/331, 213, 526/215, 217, 318, 319, 330, 318.4

[56] References Cited

U.S. PATENT DOCUMENTS

| | | | |
|---|---|---|---|
| 3,492,369 | 1/1970 | Naylor | 525/313 |
| 3,546,323 | 12/1970 | Hwa et al. | 525/313 |
| 3,669,942 | 6/1972 | Van Westrenen et al. | 526/318 |
| 4,512,775 | 4/1985 | Chen | 526/331 |
| 4,756,843 | 7/1988 | Jarrin et al. | 526/329.2 |

FOREIGN PATENT DOCUMENTS

| | | |
|---|---|---|
| 349818 | 1/1990 | European Pat. Off. |
| 355408 | 2/1990 | European Pat. Off. |

*Primary Examiner*—David W. Wu

[57] ABSTRACT

The invention relates to copolymers containing on average 1.25 to 30 functional groups per molecule and a number average molecular weight of 1500 to 6000, which copolymers can be prepared by free-radical solution polymerization at 130° to 200° C. from 5 to 25% by weight of vinyl ester, 10 to 50% by weight of vinyl aromatic, 10 to 40% by weight of functional, monomers and, if desired further monomers, in which the vinyl ester is initially introduced and the remaining monomers are metered in for all monomers over a monomer addition period which is of the same length in the following manner: The amount of acrylate monomers added per unit of time remains constant. The amount of vinyl aromatic added over the first third of the monomer addition period is 15 to 30% by weight, the amount added over the second third is 25 to 40% by weight, and the amount added over the last third is 35 to 60% by weight, each relative to the total amount of vinyl aromatic. The copolymer obtained is, if desired, reacted with compounds containing a group which is reactive towards the functional groups of the copolymer and at least one crosslinkable group.

21 Claims, No Drawings

SOLUBLE CROSSLINKABLE COPOLYMERS BASED ON VINYL ESTER, VINYL AROMATIC AND ACRYLATE MONOMERS, PROCESSES FOR THEIR PREPARATION AND THEIR USE IN COATING AGENTS

The present invention relates to a copolymer (C) preparable by solution polymerization and containing crosslinkable groups—with the exception of hydroxyl, carboxyl and amino groups—which copolymer is based on vinyl esters, vinyl aromatics, ethylenically unsaturated monomers containing at least one functional group and, if desired, further copolymerizable monomers.

The present invention also relates to processes for the preparation of these soluble crosslinkable copolymers and to their use.

U.S. Pat. No. 4,408,018 describes acrylate copolymers having acetoacetate groups, which copolymers can be crosslinked with $\alpha,\beta$-olefinically unsaturated esters via Michael addition in the presence of strong bases. EP-B-0,160,824 describes systems having the same cross-linking principle; however, the bases used are different and have the advantage that the paint in this case has less tendency to yellow. The components to be used as Michael acceptors are obtained via known reactions (esterification and transesterification) of hydroxyl-containing acrylates having components carrying an $\alpha,\beta$-olefinically unsaturated group in addition to a group capable of esterification or transesterification. Similar systems are described in EP-B-0,161,697. Here the reaction of malonic esters with $\alpha,\beta$-unsaturated carbonyl compounds is used for the crosslinking.

EP-A-0,310,011 describes a system based on the same crosslinking principle, in which esters of methanetricarboxylic acid are used as the acidic CH component. An addition product of a glycidyl-containing acrylate copolymer with acrylic acid is used as the Michael acceptor. The systems of EP-A-0,224,158 are also based on the Michael reaction. Here methanetricarboxamides, which can be obtained by the addition reaction of isocyanate with malonic ester, function as Michael donors.

EP-A-0,203,296 also describes polymers having free acrylic groups and being crosslinkable via the Michael addition of polymers containing block amino groups.

German Offenlegungsschrift 3,710,431 describes pre-crosslinked non-gelled acrylate copolymers containing double bonds and having free acryloyl groups. These can be crosslinked via the addition reaction of compounds containing at least two active hydrogen atoms in the molecule. For example, the compounds used have at least one group containing active hydrogen atoms or at least one active hydrogen atom and a group containing active hydrogen atoms. German Patent Application 3,832,958, which is not a prior art document, also describes systems of this type, in which compounds containing primary amino groups are used as the compounds containing active hydrogen atoms. To ensure a sufficiently long pot life, the primary amino groups have been blocked by condensation with aldehydes or ketones and are only set free during the application in situ with contact with humidity. U.S. Pat. No. 3,668,183 also describes a system which comprises a polyacetoacetate or polyacetamide component and is crosslinked with (ketimine or aldimine formation) blocked amine components to give enamines. An improvement of this system with respect to water, acid and weathering resistance is described in EP-B-0,199,087. All abovementioned systems are based on copolymers containing vinyl aromatics and, in some cases, maleic anhydride or itaconic anhydride in addition to esters of acrylic acid.

Other crosslinking systems which are suitable for curing at low temperatures and abstain from using isocyanates are mentioned in EP-A-0,316,874. Here systems are described in which crosslinking can be achieved via the addition reaction of a hydroxyl-containing polymer with a cyclic carboxylic anhydride. In a second reaction, the monoester of the anhydride thus formed reacts with epoxy groups in order to ensure optimum crosslinking. EP-A-0,316,873 describes similar systems in which, apart from the components containing hydroxyl, epoxy and anhydride groups, carboxyl-containing components which are capable of reacting in a further reaction with the epoxide present are present in the paint system. Tertiary amines, preferably N-methylimidazole, are used here as catalysts.

ER-B-0,134,691 describes a system based on the same crosslinking principle and comprising an anhydride component, epoxy component and a hydroxy-functional polymer. Here it is also possible for carboxyl groups to be present in one of the components (OH or anhydride component). U.S. Pat. No. 4,816,500 describes a system which is reacted with crosslinking agents containing epoxy groups via the reaction of an anhydride-functional acrylate obtained by copolymerization of itaconic anhydride or maleic anhydride. The catalysts used are compounds having tertiary amino groups. Furthermore, systems are known which utilize, as the crosslinking reaction, the reaction of anhydride-functional polymers with amines under the influence of humidity. The high reactivity of the systems makes it necessary to block the amines via the reaction with ketones or aldehydes. German Offenlegungsschrift 3,370,066 describes such a system which contains in part hexahydropyrimidine or tetrahydroimidazole groups as the component containing hydrogen which is reactive towards anhydrides. Furthermore, according to German Offenlegungsschrift 3,726,624, oxazolanes obtained by the reaction of hydroxy amines with ketones can be used as the amine component.

In particular in the case of pigmented systems, thorough wetting of the pigments is important. This is achieved by modifying the copolymers with fatty acids or by modifying the copolymers with the glycidyl ester of carboxylic acids which are branched in the $\alpha$-position with acid-functional monomers. In clearcoats, the modification with long aliphatic groups leads to better flow and gloss which matches that of paints based on alkyd resins. This reaction can be carried out before, during or after the polymerization. A disadvantage of these copolymers is the fairly low proportion of non-volatile components at a given viscosity. This is caused by the high styrene content necessary for sufficient hardness of the films.

A further possibility is the copolymerization of vinyl esters of the aliphatic monocarboxylic acids branched in the $\alpha$-position and containing 5–15 carbon atoms with acrylic esters and vinyl aromatics. Due to the greatly different reactivity of the vinyl ester monomers compared with the vinyl aromatic and acrylic ester monomers, these copolymers lead to difficulties during the polymerization. In these cases, it is difficult to obtain uniform copolymers, i.e. of random homogeneous distribution.

One possible solution of this problem is the process described in U.S. Pat. No. 4,039,734 for the copolymerization of monomers of different reactivity, in which at least a portion of the reactive monomer is added continuously to the reaction mixture in such an amount that the relative monomer ratio remains constant. The amount of monomers required in each case is determined by means of the heat of reaction being set free. In the process described in German Patent 2,032,647, uniform vinyl ester, vinyl aromatic and hydroxy acrylate copolymers are accordingly obtained by stepwise addition of the individual monomers. In this process, the total amount of vinyl ester is initially introduced together with 5 to 15% by weight of the total amount of the vinyl aromatic and the total amount of the other hydroxy-functional monomers and unsaturated carboxylic acids. The remaining amount of monomers is then gradually added in one portion or, alternatively, metered in at such a rate that the addition of OH and COOH monomers takes longer than the addition of the vinyl aromatic. The disadvantages of this process are the very high residual monomer content (i.e. the amount of unconverted starting monomer, expressed in % by weight, relative to the originally used total amount of this monomer) of up to 40% by weight of vinyl ester, when a high proportion of vinyl aromatic of up to 50% by weight is used, and the toxicity problems connected therewith. A further unfavorable effect with respect to environmental pollution during drying of the paint films due to the solvent is the high solvent content of the coating agents which is caused by the high viscosity of the binder solutions. In addition, there is a risk that the polymer solutions of fairly high solids contents become cloudy, which can only be remedied by adding more solvent. The technical information in English "VeoVa polymers LR-40 and LR-2041 for water-thinnable paints" of Shell also describes copolymers of this type containing vinyl ester, vinyl aromatic and hydroxyalkyl ester, which, however, also have the abovementioned disadvantages.

Furthermore, several bulkpolymerization processes for the preparation of copolymers containing vinyl ester are also known, in which the total amount of the vinyl ester also, if desired together with a portion of the total amount of the other monomers and, if desired, the initiator, is heated and the remaining amount of monomers and initiator is then gradually added (cf. for example German Patent 2,422,043 and German Offenlegungsschrift 2,615,101). It is true that it is possible in these processes to incorporate the vinyl ester completely (residual monomer content<10% by weight), but the copolymer solutions thus obtained are cloudy after the initial dissolution of the polymer composition and not suitable for paint formulations.

Furthermore, the not yet published German Patent Application 3,823,005 discloses hydroxyl-containing copolymers preparable by solution polymerization of vinyl esters, vinyl aromatics, hydroxyalkyl esters of α,β-unsaturated acids and, if desired, further unsaturated monomers and have a low residual monomer content and lead to clear copolymer solutions.

Furthermore, the also not yet published German Patent Application 3,827,587 discloses amino-containing copolymers preparable by solution polymerization of vinyl esters, vinyl aromatics, alkyl esters of α,β-unsaturated acids and, if desired, further unsaturated monomers and subsequent aminolysis and which also have a low residual monomer content and give clear solutions of low viscosity.

Finally the also not yet published German Patent Application 3,918,699 discloses copolymers containing carboxyl groups and, if desired, tertiary amino groups which are obtained by copolymerization of monomers containing carboxyl groups and, if desired, tertiary amino groups or by the addition reaction of acid anhydrides with OH functional copolymers. They also have a low residual monomer content and form clear copolymer solutions.

Accordingly, the object of the invention was to supply crosslinkable copolymers based on vinyl ester, vinyl aromatic and other copolymerizable monomers, which copolymers also have, at a high vinyl aromatic content of up to 50% by weight, relative to the total monomer amount, a low residual monomer content (<10% by weight, relative to the amount of vinyl ester monomer used) of vinyl ester monomers and give clear solutions. The coating agents prepared by using these copolymers should have a viscosity favorable for the processing of 16–20 s, measured by the DIN 4 cup, in combination with the highest possible solids content and should lead to coatings having good technological properties, in particular good hardness. The compositions should, if desired, be curable at room temperature or slightly elevated temperature and thus be usable, for example, in automotive repair coatings.

Finally, the quality level of these systems should be close to the quality level of two-component polyurethane coatings with respect to reactivity and development of hardness even without the use of isocyanates as crosslinking component.

Surprisingly, this object is achieved by a copolymer (C) preparable by means of solution polymerization and containing crosslinkable groups—with the exception of hydroxyl, carboxyl and amino groups—and being synthesized from vinyl esters, vinyl aromatics, ethylenically unsaturated monomers having at least one functional group and, if desired further copolymerizable monomers. Copolymer (C) is a copolymer containing on average 1.25 to 30, preferably 2 to 15, functional groups per molecule and an average molecular weight (number average) of 1500 to 6000 and is preparable by (A) synthesizing a copolymer by free-radical solution polymerization at temperatures of 130° to 200° C., preferably 150° to 180° C., of
 $a_1$) 5 to 25% by weight, preferably 10 to 19% by weight, of one or more vinyl esters of monocarboxylic acids, preferably vinyl esters of monocarboxylic acids branched in the α-position and containing 5 to 15 carbon atoms per molecule,
 $a_2$) 10 to 50% by weight, preferably 20 to 45% by weight, of one or more vinyl aromatic hydrocarbons,
 $a_3$) 10 to 40% by weight, preferably 15 to 35% by weight, of one or more ethylenically unsaturated monomers containing at least one functional group and
 $a_4$) 0 to 40% by weight of other ethylenically unsaturated, copolymerizable monomers, the sum of components $a_1$ to $a_4$ amounting in each case to 100% by weight, by
1.) initially introducing at least 60% by weight, preferably 100% by weight, of the total amount of component $a_1$,
2.) metering in components $a_2$ to $a_4$ and any remainder of component $a_1$ over a monomer addition period which is of the same length for all components in such a manner that
 i) the amount of component $a_1$ added per unit of time over the monomer addition period remains constant or decreases,
 ii) the amount of components $a_3$ and $a_4$ added per unit of time over the monomer addition period remains constant and
 iii) the amount of component $a_2$ added over the first third of the monomer addition period is 15 to 30% by weight, preferably 18 to 26% by weight, of the total amount of component $a_2$, the amount added over the second third is 25 to 40% by weight, preferably 30 to 38% by weight, and the amount added over the last third is 35 to 60% by weight, preferably 40 to 50% by weight, of the total amount of component $a_2$ and (B) the copolymer obtained in step A is, if desired, reacted with compounds (V) which contain a group which is reactive towards the groups of component $a_3$ and at least one crosslinkable group, with the exception of hydroxyl, carboxyl and amino groups.

As component $a_1$, vinyl esters of monocarboxylic acids, preferably vinyl esters of monocarboxylic acids branched in the α-position and containing 5 to 15 carbon atoms per molecule, are used. The branched monocarboxylic acids can be obtained by reacting formic acid or carbon monoxide and water with olefins in the presence of a liquid, strongly acidic catalyst; the olefins can be cracking products of paraffinic hydrocarbons, such as mineral oil fractions, and can contain not only branched but also straight-chain acyclic and/or cycloaliphatic olefins. In the reaction of these olefins with formic acid or with carbon monoxide and water, a mixture of carboxylic acids is formed in which the carboxyl group is predominantly on a quaternary carbon atom. Other olefinic starting materials are, for example, propylene trimer, propylene tetramer and diisobutylene. The vinyl esters can also be prepared from the acids in a manner known per se, for example, by reacting the acids with acetylene. Due to their good availability, vinyl esters of saturated aliphatic monocarboxylic acids having 9–11 carbon atoms and being branched on the α-carbon atom are particularly preferred. Furthermore, the vinyl ester of p-tertiarybutylbenzoic acid is particularly preferred. Examples of further suitable vinyl esters are vinyl acetate and vinyl propionate.

The amount of components $a_1$ is 5 to 25% by weight, preferably 10 to 19% by weight.

Component $a_2$ is a monovinyl aromatic compound. It preferably contains 8 to 9 carbon atoms per molecule. Examples of suitable compounds are styrene, vinyltoluenes, α-methylstyrene, chlorostyrenes, o-, m- or p-methylstyrene, 2,5-dimethylstyrene, p-methoxystyrene, p-tert.-butylstyrene, p-dimethylaminostyrene, p-acetamidostyrene and m-vinylphenol. Vinyltoluenes and in particular styrene are preferably used. The amount of component $a_2$ is 10 to 50% by weight, preferably 20 to 45% by weight.

The monomers of component $a_3$ are comonomers known from the literature and having any desired functional group, the selection of this functional group depending on the type of the crosslinking component used and on whether this functional group serves to crosslink the polymers or on whether the copolymer is additionally reacted in a second step with compounds having at least one other crosslinkable group, apart from a group which is reactive with the functional groups of component $a_3$. Advantageously, suitable monomers of component $a_3$ are monomers containing groups having active hydrogen, preferably acetoacetato-containing monomers, such as, for example, acetoacetoxyethyl methacrylate, adducts of hydroxyalkyl esters of acrylic and methacrylic acid with methyl acetoacetate, ethyl acetoacetate, n-propyl acetoacetate, iso-propyl acetoacetate, n-butyl acetoacetate, iso-butyl acetoacetate and t-butyl acetoacetate.

Acetoacetoxyethyl methacrylate is preferably used.

Apart from the possibility of introducing the acetoacetate groups or groups containing active hydrogen directly into the copolymer via appropriate monomers, it is furthermore preferably possible to introduce these acetoacetate groups and the like which serve to crosslink the copolymer by first synthesizing a hydroxyl-containing copolymer (A) which in a second step is reacted with compounds (V) containing a group which is reactive towards hydroxyl groups and at least one active hydrogen atom. Compounds (V) containing acetoacetate groups are preferably used.

Suitable components $a_3$ are in this case hydroxyalkyl esters of α,β-unsaturated carboxylic acids having primary or secondary hydroxyl groups. It is of course also possible to use mixtures of hydroxyalkyl esters having primary hydroxyl groups and hydroxyalkyl esters having secondary hydroxyl groups. Examples of suitable hydroxyalkyl esters of α,β-unsaturated carboxylic acids having primary hydroxyl groups are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples of usable hydroxyalkyl esters having a secondary hydroxyl group are 2-hydroxypropyl acrylate, 2-hydroxybutyl acrylate, 3-hydroxybutyl acrylate and the corresponding methacrylates. It is of course also possible to use in each case the corresponding esters of other α,β-unsaturated carboxylic acids, such as, for example, of crotonic acid and isocrotonic acid.

Advantageously, at least a portion of component $a_3$ can be a reaction product of 1 mol of hydroxyethyl acrylate and/or hydroxyethyl methacrylate and on average 2 mol of ε-caprolactone.

At least a portion of component $a_3$ can also be a reaction product of acrylic acid and/or methacrylic acid with the glycidyl ester of a carboxylic acid having a tertiary α-carbon atom. Glycidyl esters of highly branched monocarboxylic acids are available under the trade name "Cardura". The reaction of acrylic acid or methacrylic acid with the glycidyl ester of a carboxylic acid having a tertiary α-carbon atom can be carried out before, during or after the polymerization reaction. Care must be taken that the acid number of the finished polyacrylate is in the range from 5 to 30 mg of KOH/g, preferably 8 to 25 mg of KOH/g.

Compounds (V) suitable for introducing the acetoacetate groups into copolymer (C) are in particular alkyl esters of acetoacetic acid having 1 to 4 carbon atoms in the alkyl radical, for example ethyl acetoacetate, t-butyl acetoacetate, methyl acetoacetate, n-propyl acetoacetate, iso-propyl acetoacetate, n-butyl acetoacetate and iso-butyl acetoacetate.

Ethyl acetoacetate and t-butyl acetoacetate are preferably used.

Furthermore, other acidic C—H groups, for example based on cyanoacetic acid, malonic acid, cyclopentanonecarboxylic acid, methanetricarboxylic acid and cyclohexanonecarboxylic acid and their respective alkyl esters or other suitable derivatives, can be present in copolymer (C) as crosslinkable reactive groups. These groups can be introduced analogously to the acetoacetate groups by first synthesizing a hydroxyl-containing acrylate copolymer (A) which is esterified with the acids mentioned or transesterified with the alkyl esters. Apart from this, there is however also the possibility of preparing first a carboxyl-containing acrylate copolymer (A) by using carboxyl-containing monomers $a_3$ and then reacting this carboxyl-containing copolymer A with compounds (V), which are reaction products of a polyepoxide having n mol of epoxy groups and (n−1) mol of a compound having carboxyl or amino groups with the group containing active hydrogen. An example of these is the reaction product of 1 mol of trimethylolpropane triglycidyl ether and 2 mol of cyanoacetic acid or 2 mol of acetoacetic acid. Advantageously, ethylenically unsaturated double bonds can also be introduced into the copolymer as crosslinkable groups, which is effected particularly preferably by means of a two-step process in which first a copolymer (A) having functional groups, such as, for example hydroxyl, carboxyl, epoxy, amino, isocyanate and ester groups, is synthesized, and this copolymer (A) is then reacted with compounds (V) which, apart from at least one ethylenically unsaturated double bond, additionally contain a group which can be reactive with the functional groups of component a₃. Thus, suitable components a₃ are the hydroxyl-containing monomers already mentioned above. The hydroxyl-containing copolymer (A) thus prepared can then be reacted in a second step with monoesters of α,β-unsaturated carboxylic acids as compound (V) in a transesterification reaction. Advantageously, esters of α,β-unsaturated carboxylic acids whose eater groups do not have more than 4 to 6 carbon atoms are suitable as compound (V) in this case, such as, for example, methyl acrylate, ethyl acrylate, propyl acrylate, butyl acrylate, isopropyl acrylate, isobutyl acrylate, pentyl acrylate, the corresponding methacrylates and the corresponding esters of fumaric acid, maleic acid, crotonic acid, dimethylacrylic acid. Compounds (V) are reacted in known transesterification reactions with the OH groups of the acrylate copolymer (A). Furthermore, the hydroxyl-containing copolymer (A) can also be reacted with α,β-unsaturated carboxylic acids as compounds (V) in known esterification reactions. Examples of suitable α,β-unsaturated carboxylic acids are acrylic, methacrylic, fumaric, maleic, crotonic, isocrotonic and dimethylacrylic acids. Acrylic and methacrylic acid are preferably used.

Advantageously, it is also possible to use for the reaction with the hydroxyl-containing copolymer (A) compounds (V) which are an alkoxymethyl-containing amide of an α,β-unsaturated carboxylic acid or have the general formula

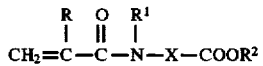

where

R is H, CH₃

R¹ is H, alkyl, aryl

R² is alkyl

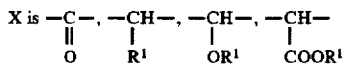

Examples of compounds of this type are methoxymethylacrylamide, methoxymethylmethacrylamide, butoxymethylacrylamide, butoxymethylmethacrylamide, isobutoxymethylacrylamide, isobutoxymethylmethacrylamide, analogous amides of fumaric acid, crotonic acid and dimethylacrylic acid, glycolic acid derivatives, such as N-acryloylmethylglycolamide methyl ether, N-acryloylbutylglycolamide butyl ether, N-acryloylmethylglycolamide and N-acryloylbutylglycolamide.

However, the copolymers according to the invention can also be prepared by using epoxy-containing monomers as component a₃ and preferably reacting the resulting epoxy-containing copolymer (A) subsequently with compounds (V) which, apart from at least one ethylenically unsaturated double bond, contain a carboxyl or amino group. It is of course also possible to use the epoxy-containing copolymer directly for the crosslinking as copolymer having crosslinkable groups.

Suitable epoxy-containing ethylenically unsaturated monomers a₃ are glycidyl esters of unsaturated carboxylic acids and/or glycidyl ethers of unsaturated compounds, such as, for example, glycidyl acrylate, glycidyl methacrylate, glycidyl esters of fumaric and maleic acid, glycidyl vinylphthalate, glycidyl allylphthalate and glycidyl allylmalonate. Compound (V) is advantageously selected from the group comprising acrylic acid, methacrylic acid, crotonic acid, dimethylacrylic acid, monomethyl fumarate, reaction products of carboxylic anhydrides with hydroxyalkyl esters of α,β-unsaturated acids, such as adducts of hexahydrophthalic anhydride, phthalic anhydride, tetrahydrophthalic anhydride or maleic anhydride with hydroxyethyl (meth) acrylate, hydroxypropyl (meth)acrylate. Compound (V) can furthermore be t-butylaminoethyl (meth)acrylate, bis (acrylamido)acetic acid or bis(acrylamidoethyl)amine. Compounds having several activated double bonds, such as, for example, bis(acrylamido)acetic acid, are particularly preferably used.

Furthermore, it is also possible to use as component a₃ carboxyl-functional monomers, for example acrylic, methacrylic, itaconic, crotonic, isocrotonic, aconitic, maleic and fumaric acid, monoesters of maleic and fumaric acid and β-carboxyethyl acrylate and adducts of hydroxyalkyl esters of acrylic acid and/or methacrylic acid with carboxylic anhydrides, such as, for example, mono-2-methacryloyloxyethyl methylhexahydrophthalate, mono-2-methacryloyloxyethyl hexahydrophthalate, and mono-2-methacryloyloxyethyl phthalate. The carboxyl-containing copolymer (A) thus obtained is then reacted in a second step with compounds (V) which, apart from at least one ethylenically unsaturated double bond, additionally contain an OH, NH, epoxy or SH group. Examples of suitable compounds (V) are the already listed hydroxyalkyl esters of ethylenically unsaturated carboxylic acids and the already listed epoxy-containing monomers. The copolymers (C) according to the invention can also contain cyclic anhydride groups as crosslinkable groups. These copolymers (C) can be prepared by using anhydride-containing monomers a₃, such as, for example, maleic anhydride, itaconic anhydride, citraconic anhydride, propenylsuccinic anhydride and other copolymerizable compounds having cyclic carboxylic anhydride groups. Advantageously, the anhydride-containing copolymers (C) additionally contain other functional groups which are not capable of reacting with the cyclic anhydride groups. The anhydride-containing copolymers particularly preferably contain additionally free carboxyl groups which can serve not only for crosslinking but also, if present only in minor amounts, to improve their pigment wetting. These acid functions can be introduced either by the additional use of acid-functional monomers a₃ or by partial hydrolysis of the anhydride functions. The incorporation of glycidyl groups in addition to the anhydride groups is also advantageous.

Copolymer (A) can also contain ester-containing monomers as functional monomer a₃ in which the esterification alcohol should advantageously not contain more than 6 carbon atoms, preferably 1 to 4 carbon atoms. This ester-containing copolymer (A) is then reacted with compounds (V) which, apart from at least one ethylenically unsaturated double bond, contain an OH, NH or SH group. Suitable ester-containing monomers a₃ are alkyl esters of acrylic acid, methacrylic acid, crotonic acid, maleic and fumaric acid, such as, for example, the corresponding methyl, ethyl, propyl, isopropyl, butyl, isobutyl and pentyl esters. Longer-chain alcohol radicals in the ester group are less favorable, since their transesterification and their removal by distillation after the transesterification requires excessively high temperatures. The corresponding aminoalkyl esters of the α,β-unsaturated carboxylic acids mentioned are also suitable. The copolymer containing the crosslinkable groups is then obtained by transesterification or transamidation reactions. These reactions are known to one skilled in the art and do not require any further explanation.

Examples of suitable OH—, NH— and SH-containing, ethylenically unsaturated compounds (V) are the already listed compounds (V) which are suitable for the reaction with carboxyl-containing copolymers (A).

Isocyanato-containing monomers can also be used as component $a_3$. The copolymer obtained having isocyanate groups is preferably reacted in a second step with compounds (V) which, apart from at least one ethylenically unsaturated double bond, additionally contain an OH, NH, SH or COOH group.

The isocyanato-containing monomers $a_3$ can be selected from the group comprising vinylic isocyanates, such as, for example, vinyl isocyanate and m-isopropenyl-$\alpha,\alpha$-dimethylbenzyl isocyanate, isocyanatoalkyl esters of $\alpha,\beta$-unsaturated carboxylic acids of the general formula

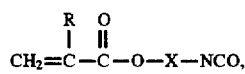

in which

R is H, CH$_3$, C$_2$H$_5$ and

X is (CH$_2$)$_n$ where n is 1–12.

It is also possible to use adducts, for example of isophorone diisocyanate with hydroxyalkyl(meth)acrylate, such as, for example, hydroxyethyl methacrylate, as component $a_3$.

Examples of suitable OH—, SH—, NH— and COOH-containing ethylenically unsaturated compounds (V) are the monomers already mentioned. However, it is advantageous to select for the addition reaction those compounds which contain two or more ethylenically unsaturated double bonds apart from the OH, NH, SH or COOH groups. In this manner, two or more double bonds are introduced with one addition step. This is favorable insofar as the addition reaction of hydroxyl groups with isocyanate groups forms urethane or urea groups which in general strongly increase the viscosity of the binders, which is not always desirable. An example of these are the reaction products from acrylic acid or methacrylic acid or another $\alpha,\beta$-ethylenically unsaturated carboxylic acid with glycidyl acrylate or glycidyl methacrylate. This reaction creates a free hydroxyl group which then forms an adduct with the NCO groups of the acrylate copolymer.

Advantageously, the monomer component $a_3$ for preparing the acrylate copolymer (A) can be an amide of an $\alpha,\beta$-unsaturated carboxylic acid containing alkoxymethyl groups or a compound of the general formula

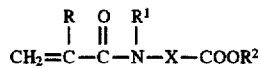

where

R is H, CH$_3$

R$^1$ is H, alkyl, aryl

R$^2$ is alkyl,

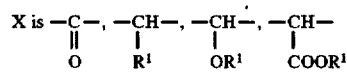

In this case, it may be desirable to use as compound (V) compounds which contain, apart from at least one ethylenically unsaturated double bond, OH, NH or SH groups.

Examples of monomers $a_3$ of this type are N-alkoxymethyl (meth)acrylamides, such as methoxymethylacrylamide, methoxymethylmethacrylamide, isobutoxyacrylamide, isobutoxymethacrylamide and isobutoxymethylmethacrylamide. N-(meth)acryloylalkoxyglycolamide alkyl ethers are also suitable.

Copolymer (C) can furthermore be synthesized by using 0 to 40% by weight of other, ethylenically unsaturated copolymerizable monomers (component $a_4$). The selection of these monomers is not particularly critical. However, care must be taken that the incorporation of these monomers does not lead to undesirable properties of the copolymer. Thus, the selection of component $a_4$ depends largely on the desired properties of the curable composition with respect to elasticity, hardness, compatibility and polarity. Alkyl esters of olefinically unsaturated carboxylic acids are preferably used as component $a_4$. Examples of these are methyl (meth) acrylate, ethyl (meth)acrylate, propyl (meth)acrylate, butyl (meth)acrylate, isopropyl (meth)acrylate, isobutyl (meth) acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate and the corresponding esters of maleic, fumaric, tetrahydrophthalic, crotonic, isocrotonic, vinylacetic and itaconic acid. Further suitable components $a_4$ are other ethylenically unsaturated compounds, such as, for example, alkoxyethyl acrylates, aryloxyethyl acrylates and the corresponding methacrylates, such as, for example, butoxyethyl (meth)acrylate, phenoxyethyl (meth)acrylate; unsaturated carboxylic acids, such as, for example, acrylic acid, methacrylic acid, itaconic acid, crotonic acid and monoesters of maleic and fumaric acid and mixtures thereof; unsaturated compounds having tertiary amino groups, such as, for example, N,N'-diethylaminoethyl methacrylate, 2-vinylpyridine, N,N-dimethylaminoethyl methacrylate, 4-vinylpyridine, vinylpyrroline, vinylquinoline, vinylisoquinoline, N,N'-dimethylaminoethyl vinyl ether and 2-methyl-5-vinylpyridine; compounds such as, for example, acrylonitrile, methacrylonitrile, acroleine and methacroleine.

The polymerization of monomer components $a_1$ to $a_4$ is preferably carried out with the exclusion of oxygen, for example by working in a nitrogen atmosphere. The reactor is equipped with suitable stirring, heating and cooling units and a reflux condenser in which volatile components, such as, for example, styrene are retained.

The polymerization reaction is carried out at temperatures of 130°–200° C., preferably 150°–180° C., using polymerization initiators and, if desired, polymerization regulators. Suitable free-radical initiators are organic peroxides, such as, for example, dibenzoyl peroxide, dicumyl peroxide, t-butylcumyl peroxide, t-amylcumyl peroxide, cumene hydroperoxide, di-tert.-butyl peroxide, tert.-butyl hydroperoxide, 2,2-di-tert.-butyl peroxybutane, tert.-amyl perbenzoate, 1,3-bis (tert.-butyl peroxyisopropyl)benzene, diisopropylbenzene monohydroperoxide and diacyl peroxides, such as, for example, diacetyl peroxide, peroxyketals, such as, for example, 2,2-di(tert.-amylperoxy) propane and ethyl 3,3-di(tert.-amylperoxy)butyrate, thermolabile highly substituted ethane derivatives, for example based on silyl-substituted ethane derivatives and based on benzopinacole. Furthermore, aliphatic azo compounds, such as, for example, azobis(cyclohexanenitrile), can also be used. When azo compounds are used, there is, however, depending on the monomer used, a risk of yellowing of the polymers, which may be troublesome—depending on the particular use of the polymers—so that in these cases other initiators must be used. The amount of initiator is in most cases 0.1 to 5% by weight, relative to the amount of monomer to be processed, but, if desired, it can also be higher. The initiator, dissolved in a portion of the solvent used for the polymerization, is gradually metered in during the polymerization reaction. Preferably, the initiator addition takes about 1 to 2 hours longer than the monomer addition, in order to achieve also a good effect during the postpolymerization phase. If initiators which have only a small decay rate are used under the reaction conditions present, it is also possible to initially introduce the entire initiator or part of it. The reaction is preferably carried out in the presence of polymerization regulators, since in this manner it is easier to avoid clouding of the polymer solutions. Suitable regulators are preferably mercapto compounds, of which mercaptoethanol is particularly preferably used. Examples of other possible regulators are alkanethiols, such as, for example, t-dodecanethiol, octanethiol, benzenethiol, octadecanethiol, butanethiol, thiocarboxylic acids, such as thioacetic acid or thiolactic acid. In the presence of anhydride-functional comonomers, care must be taken that the regulator does not or only to a small extent react with the cyclic anhydride groups. In this case, t-dodecanethiol is preferably used. These regulators are used in amounts of up to 2% by weight, relative to the amount of monomers to be processed. They are preferably dissolved in one of the monomer feeds and added together with the monomers. The amount of regulator is preferably added at a constant rate.

The polymerization is carried out in a high-boiling organic solvent which is inert towards the monomers used. Examples of suitable solvents are high-boiling alcohols, such as, for example, n-hexanol, 2-ethylhexanol, isooctyl alcohol, isononyl alcohol, isodecyl alcohol, isotridecyl alcohol, cyclohexanol, methylcyclohexanol, benzyl alcohol, methylbenzyl alcohol, tetrahydrofufuryl alcohol, diacetone alcohol, 2,6-dimethyl-4-heptanol, 4-methyl-2-pentanol, tridecanol, glycols and glycol derivatives, such as, for example, ethylene glycol, 1,2-propylene glycol, 1,3-butylene glycol, 1,4-butanediol, hexylene glycol, 2-ethyl-1, 3-hexanediol, diethylene glycol, triethylene glycol, dipropylene glycol, methyldiglycol, ethyldiglycol, butyldiglycol, hexyldiglycol, tripropylene glycol methyl ether, methoxytriglycol, ethylglycol acetate, butylglycol acetate, ethyldiglycol acetate, ethylene glycol diacetate; fairly highly substituted aromatics, such as, for example, Solvent Naphtha®, 160 degree benzene, various Solvesso® types, various Shellsol® types and Deasol® and higher-boiling aliphatic and cycloaliphatic hydrocarbons, such as, for example, various petroleum spirits, mineral terpentine oil, tetraline and decaline. For certain monomer combinations (such as, for example, amino-functional plus carboxyl-functional monomers), only inert solvents, such as aromatic and aliphatic hydrocarbons or esters, should be used.

If the copolymers are additionally modified in a second step by reaction with compounds (V) containing a group which is reactive towards the groups of component $a_3$ and at least one crosslinkable group, the solvent used in the polymerization, i.e. the preparation of polymers (A) must of course also be inert towards compounds (V). It is essential to the invention that the copolymerization of components $a_1$ to $a_4$ is carried out as follows: first at least 60% by weight, preferably 100% by weight, of the total amount of component $a_1$ to be used are initially introduced in the reactor together with a portion of the total amount of solvent to be used, and the mixture is heated to the particular reaction temperature. The remaining amount of solvent is—as already described—preferably added gradually together with the catalyst. Any remaining amount of component $a_1$ and the remaining monomers (components $a_2$, $a_3$ and $a_4$) are metered in to the initially introduced component $a_1$ as follows over a monomer addition period which is of the same length for all components (it is in general 2–10 h, as is customary for acrylate copolymerizations):

i) the amount added per unit of time of any still remaining component $a_1$ (i.e. the remaining amount of component $a_1$ which was not initially introduced) remains constant over the monomer addition period or decreases, the latter process variation being preferred. If the amount added is constant, component $a_1$ is metered in preferably together with components $a_3$ and $a_4$.

ii) The amount added per unit of time of components $a_3$ and $a_4$ remains constant over the monomer addition period.

iii) The amount added per unit of time of component $a_2$ is varied over the monomer addition period such that the total amount of component $a_2$ added over the first third of the monomer addition period is 15 to 30% by weight, preferably 18 to 26% by weight, of the total amount of component $a_2$. A total of 25 to 40% by weight, preferably 30 to 38% by weight, are metered in over the second third of the monomer addition period, and 35 to 60% by weight, preferably 40 to 50% by weight, of the total amount of component $a_2$ are metered in over the last third of the monomer addition period, the sum of the amounts added in the 1st, 2nd and 3rd third amounting of course to 100% by weight.

There are various possibilities of varying the amount of component $a_2$ added per unit of time; the important thing is only that the abovementioned overall amounts added in each third are observed. Thus, it is possible, for example, to change the amount of component $a_2$ added per unit of time stepwise. The number of steps for which the amount added is changed in each case can be selected as desired. Thus, for example, the amount of component $a_2$ added per unit of time can only be increased at the beginning of the second and/or at the beginning of the third third. The amount added per unit of time then remains constant in each case throughout each third. However, it is also possible to change the amount of component $a_2$ added per unit of time continuously, according to the limiting case of an infinite number of steps.

Adding the components in the manner mentioned promotes, as is assumed, the copolymerization and reduces the homopolymerization of the individual components. In addition, copolymers are obtained which have a very low residual monomer content and give clear solutions having a high solids content. The copolymers (C) thus obtained have a functional group content per molecule of on average 1.25 to 30, preferably 2 to 15, and an average molecular weight (number average) of 1500 to 6000. The typical viscosity of 50% solutions of the copolymers according to the invention in butyl acetate is 0.2 to 4 dPas at 23° C.

The invention also relates to a process for the preparation of copolymers (C) having crosslinkable groups, with the exception of hydroxyl, amino and carboxyl groups, and being based on vinyl esters, vinyl aromatics, ethylenically unsaturated monomers having at least one functional group and, if desired, further copolymerizable monomers by means of free-radical solution polymerization, which comprises (A) synthesizing a copolymer by free-radical solution polymerization at temperatures of 130° to 200° C., preferably 150° to 180° C., of $a_1$) 5 to 25% by weight, preferably 10 to 19% by weight, of one or more vinyl esters of monocarboxylic acids, preferably vinyl esters of monocarboxylic acids branched in the α-position and containing 5 to 15 carbon atoms per molecule, a$_2$) 10 to 50% by weight, preferably 20 to 45% by weight, of one or more vinyl aromatic hydrocarbons, a$_3$) 10 to 40% by weight, preferably 15 to 35% by weight, of one or more ethylenically unsaturated monomers containing at least one functional group and a$_4$) 0 to 40% by weight of other ethylenically unsaturated, copolymerizable monomers, the sum of components a$_1$ to a$_4$ amounting in each case to 100% by weight, by 1.) initially introducing at least 60% by weight, preferably 100% by weight, of the total amount of component a$_1$, 2.) metering in components a$_2$ to a$_4$ and any remainder of component a$_1$ over a monomer addition period which is the same length for all components in such a manner that i) the amount of component a$_1$ added per unit of time over the monomer addition period remains constant or decreases, ii) the amount added per unit of time of components a$_3$ and a$_4$ remains constant over the monomer addition period and iii) the amount of component a$_2$ added over the first third of the monomer addition period is 15 to 30% by weight, preferably 18 to 26% by weight, of the total amount of component a$_2$, the amount added over the second third is 25 to 40% by weight, preferably 30 to 38% by weight, and the amount added over the last third is 35 to 60% by weight, preferably 40 to 50% by weight, of the total amount of component a$_2$ and (B) the copolymer obtained in step A is, if desired, reacted with compounds (V) which contain a group which is reactive towards the groups of component a$_3$ and at least one crosslinkable group, with the exception of hydroxyl, amino and carboxyl groups.

Components a$_1$ to a$_4$ usable in this process and the procedure of the process according to the invention have already been described in detail in conjunction with the copolymers (C) according to the invention, so that here only reference is made to this description.

The present invention furthermore relates to coating agents containing the copolymers according to the invention as binder components. Suitable curing components in these coating agents are compounds having groups which are reactive towards the crosslinkable groups of copolymer (C). The crosslinking agent is added to the binders in such an amount that the molar ratio of the reactive groups of the copolymer (C) to the reactive groups of the crosslinking agent is between 0.3:1 and 3:1. The selection of the type of crosslinking agent depends on the type of reactive crosslinkable groups of copolymer (C). If copolymer (C) contains, as crosslinkable groups, ethylenically unsaturated double bonds, epoxy or anhydride groups, it is possible to use as crosslinking component compounds containing either at least one primary amino group which is blocked with an aldehyde or ketone having not more than 10 atoms or at least 2 groups which are hydrolyzable to give NH groups and which can serve as Michael donors.

Examples of suitable compounds which can be used in the form of an aldimine or ketimine are aliphatic and/or cycloaliphatic amines having at least one, preferably two or four, primary amino groups and 2 to 24 carbon atoms. They preferably have number average molecular weights below 700. Furthermore, they preferably have in addition 0 to 4 secondary amino groups. Furthermore, alkanolamines are also preferred.

Examples of suitable amines are ethylenediamine, tri-, tetra-, penta-, hexa-, hepta-, nona-, deca-, dodecamethylenediamine, 2,2,4- and 2,4,4-trimethylhexamethylenediamine, propylenediamine, 1,3- and 1,4-butylenediamine, isophoronediamine, 1,2- and 1,4-diaminocyclohexane, 4,4,-diaminodicyclohexylmethane, bis(3-methyl-4-aminocyclohexyl)methane, 2,2-bis(4-aminocyclohexyl)propane, 4,7-dioxadecane-1,10-diamine, 4,9-dioxadodecane-1,12-diamine, 7-methyl-4,10-dioxatridecane-1,13-diamine, nitrilotris(ethanamine), ethanolamine, propanolamine, N-(2-aminoethyl)ethanol, polyether polyamine, bis(3-aminopropyl)methylamine, 3-amino-1-methylaminopropane, 3-amino-1-(cyclohexylamino)propane, N-(2-hydroxyethyl) ethylenediamine, tris-(2-aminoethyl)amine and polyamines of the formula H$_2$N(R$_2$—NH)$_n$—R$_1$—NH$_2$. n is an integer between 1 and 6, preferably 1 and 3, R$_1$ and R$_2$ are identical or different alkylene groups containing cycloalkylene groups or ether groups and having 2–6, preferably 2–4, carbon atoms. Examples of polyalkylene polyamines of this type are diethylenetriamine, triethylenetetraamine, tetraethylenepentamine, dipropylenetriamine, tripropylenetetramine, tetrapropylenepentamine and dibutylenetriamine. In particular diethylenetriamine is preferred. Furthermore, amino compounds which are suitable as crosslinking component are the reaction products of an amine described in EP-B-203,296, which, in addition to the primary amino group blocked as an imine (9.e. a primary amino group which is blocked with an aldehyde or ketone having not more than 10 carbon atoms), additionally contains OH, NH or SH groups, with a monoisocyanate, monoepoxide or a monofunctional α,β-unsaturated carbonyl compound. For more details, reference is made to EP-B-203,296. To prepare this component, cycloaliphatic amines having 5 to 15 carbon atoms, such as, for example, isophoronediamine, 4,4'-dicyclohexylmethanediamine and 3,3'-dimethyl-4,4'-dicyclohexylmethanediamine are preferably used. Suitable crosslinking agents are also reaction products of alkanolamines, mercaptoamines or primary amines which additionally have an NH group with di- and polyisocyanates, di- and polyepoxides and α,β-unsaturated carbonyl compounds.

Examples of suitable di- or polyisocyanates are: aromatic isocyanates, such as, for example, 2,4-, 2,6-toluylene diisocyanate and mixtures thereof, 4,4'-diphenylmethane diisocyanate, m-phenylene diisocyanate, p-phenylene diisocyanate, 4,4-diphenyl diisocyanate, 1,5-naphthaline diisocyanate, 1,4-naphthaline diisocyanate, 4,4'-toluidine diisocyanate, xylylene diisocyanate and substituted aromatic systems, such as, for example, dianisidine diisocyanate, 4,4'-diphenyl ether diisocyanate or chlorodiphenylene diisocyanate and higher-functional aromatic isocyanates, such as, for example, 1,3,5-triisocyanatobenzene, 4,4',4"-triisocyanatotriphenylmethane, 2,4,6-triisocyanatotoluene and2,2',5,5'-tetraisocyanato-4,4'-diphenyldimethylmethane; cycloaliphatic isocyanates, such as, for example, 1,3-cyclopentyl diisocyanate, 1,4-cyclohexyl diisocyanate, 1,2-cyclohexyl diisocyanate and isophorone diisocyanate; aliphatic isocyanates, such as, for example, trimethylene diisocyanate, tetramethylene diisocyanate, pentamethylene diisocyanate, hexamethylene diisocyanate, trimethylhexamethylene 1,6-diisocyanate and trishexamethylene triisocyanate.

Examples of suitable α,β-unsaturated carbonyl compounds are, inter alia, α,β-unsaturated dicarboxylic acids or esters thereof, for example maleic and fumaric acid. For further details of amine adducts suitable as crosslinking components, reference is made to EP-B-203,296.

As already mentioned, the abovementioned amines are used in the compositions according to the invention in their imine form, i.e. the primary amino groups are blocked by reaction with an aldehyde or ketone of not more than 10 carbon atoms, preferably 3–8 carbon atoms. Ketones are preferably used. Examples of suitable aldehydes and ketones are acetone, methyl ethyl ketone, diethyl ketone, methyl isopropyl ketone, methyl isobutyl ketone, isobutyraldehyde, 2-pentanone, cyclohexanone, ethyl amyl ketone, diisobutyl ketone, 3-octanone and decanone. Methyl isobutyl ketone and ethyl amyl ketone are particularly preferably used. This blocking reaction is known (cf. EP-B-203,296) and needs no further description.

The crosslinking component which serves as Michael donor can of course also be based on a copolymer prepared by the process according to the invention and containing vinylesters. Amino-containing crosslinking agents of this type are prepared by first preparing—as described—a copolymer (A), alkylesters of α,β-unsaturated carboxylic acids being used as component $a_3$. This copolymer (A) containing alkylester groups is then converted into the corresponding amino-containing copolymer by reaction with polyamines. Finally the amino groups are converted, as described above, into their aldimine or ketimine form. Amino-containing polymers of this type are described in Patent Application DE 3,827,587 which has not yet been published.

Reaction products of 1 mol of dialkyl maleate with 3 mol of diamine are also suitable as crosslinking agents. Other suitable di- or polyamines are polyamide resins, for example condensation products of dimerized fatty acids and difunctional amines, such as, for example, ethylenediamine. Further polymers containing amino groups include acrylate resins, polyester resins and polyurethane resins. Moreover, the amine-functional compounds mentioned in German Offenlegungsschrift 3,710,963 and in German Offenlegungsschrift 3,726,264 are suitable as crosslinking agents for anhydride-containing copolymers (C).

If the copolymer (C) according to the invention contains ethylenically unsaturated double bonds as crosslinkable groups (Michael acceptor), it is also possible to use other Michael donors as crosslinking component in addition to the amine-functional compounds mentioned, such as, for example, the compounds described in German Offenlegungsschrift 3,710,431 and EP-A-160,824 which contain at least two groups having active hydrogen atoms or at least one active hydrogen atom and at least one group having an active hydrogen atom, for example based on compounds containing acetoacetate groups or other acidic C—H compounds, for example based on cyanoacetic acid, malonic acid, cyclopentanonecarboxylic acid, cyclohexanone carboxylic acid and their respective alkyl esters. The crosslinking component can of course also in this case be based on a copolymer prepared by the process according to the invention and containing vinylesters. Crosslinking components of this type can be prepared, for example, by first preparing a carboxyl-containing copolymer by the process according to the invention, which is reacted in a second step with compounds which are reaction products of a polyepoxide having n mole of epoxy groups and (n–1) mole of a compound having carboxyl or amino groups with the group containing an active hydrogen. An example of these is the reaction product of 1 mol of trimethylolpropane triglycidyl ether and 2 mol of cyanoacetic acid or 2 mol of acetoacetic acid.

If the copolymer (C) contains epoxy groups as crosslinkable groups, acid-functional curing agents, for example based on carboxyl-containing polyesters and/or carboxyl-containing copolymers are also suitable in addition to the curing agents having amino groups or the curing agents having an active hydrogen, which have already been mentioned. The curing agent can also in this case be based on a copolymer prepared by the process according to the invention, carboxyl-containing monomers being used in this case as component $a_3$. It is also possible to prepare carboxyl-containing curing agents of this type by means of the two-step process by reacting copolymer (A) containing functional groups with compounds containing, apart from a group which is reactive towards the functional group of component $a_3$ at least one additional carboxyl group. Carboxyl-containing copolymers of this type are described in Patent Application DE 3,918,669, which has not yet been published.

The reaction of the epoxy-containing copolymers with acid-functional curing agents can, if desired, be carried out in the presence of a crosslinking catalyst. In particular tertiary amines, quaternary ammonium compounds, such as, for example, benzyltrimethylammonium hydroxide and benzyltrimethylammonium chloride are suitable for this. The crosslinking catalyst is preferably used in an amount of 0.5 to 10% by weight, relative to the weight of the epoxide component.

Instead of adding an external crosslinking catalyst, it is also possible to incorporate tertiary amino groups in the copolymer (C) or the crosslinking agent by also using suitable monomer units having tertiary amino groups when preparing these compounds. This variation of internal catalysis is generally known and need therefore not be explained in more detail.

By using an internal or external crosslinking catalyst, lower baking temperatures and/or shorter baking times are achieved. This is important in particular in the area of automotive repair coating.

If copolymers (C) contain cyclic anhydride groups as functional groups, suitable crosslinking agents are all compounds containing at least one group capable of reacting with anhydrides. Thus, for example, hydroxyl-containing compounds can be used as crosslinking agents, which first react with the anhydride-containing copolymers to give monoesters having a free acid function. This acid function can then react further, for example, with another compound containing at least one epoxy group or with an epoxy group which may be present in the same molecule. This reduces the number of the free acid groups present in the paint and leads to weather-resistant coatings, due to the higher degree of crosslinking.

Examples of suitable epoxy-containing cross-linking agents are condensation products of epichlorohydrin and bisphenol A, cycloaliphatic bisepoxides which have the formula (I) and (II):

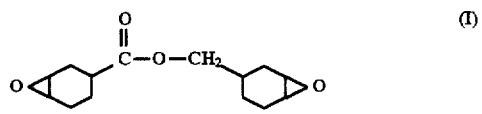

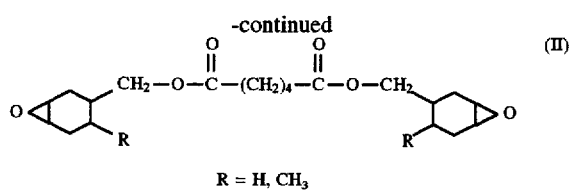

R = H, CH$_3$ and epoxidized polybutadienes, which are formed by reaction of commercially available polybutadiene oils with peracids or organic acid/H$_2$O$_2$ mixtures, epoxy-containing novolaks, glycidyl ethers of a polyhydric alcohol, for example ethylene glycol diglycidyl ether, glycerol polyglycidyl ether, sorbitol polyglycidyl ether, trimethylolpropane polyglycidyl ether and pentaerythritol polyglycidyl ether and low-molecular-weight acrylate resins having pendant oxirane groups.

Suitable epoxy-containing crosslinking agents are also the epoxy-containing copolymers (C) according to the invention, which have already been described. If desired, a crosslinking catalyst can be used for the reaction of the acid groups with the epoxy groups of the crosslinking agent. Examples of suitable compounds are the catalysts already listed on page 33 of the present description. The acid functions which serve to achieve the acid number necessary for better pigment wetting and crosslinking optimization can be present either in copolymer (C) or they can already have been introduced in the hydroxyl-containing crosslinking component by reacting a portion of the hydroxyl groups of the crosslinking component with an anhydride, this reaction product being used as cross-linking agent.

The coating agents according to the invention can furthermore contain conventional pigments and fillers in customary amounts, preferably 0 to 60% by weight, relative to the overall composition, and further customary auxiliaries and additives, such as, for example, flow-improving agents, silicone oils, plasticizers, such as phosphoric acids and phthalic esters, viscosity-controlling additives, flatting agents, UV absorbers and light stabilizers in customary amounts, preferably 0.2 to 10% by weight, relative to the overall composition.

These coating agents can be applied to a substrate in the form of a film by spraying, flooding, dipping, roller application, knife application or brush coating, after which the film is cured to give a strongly adhesive coating.

The coating agents according to the invention are suitable—if by a suitable selection of the curing component low curing temperatures between ambient temperatures and 80° C. can be applied (see above)—for repair coating of automobiles and in particular for the use as priming and filler material.

The invention is illustrated in more detail in the examples which follow. All parts and percentages given are by weight, unless expressly stated otherwise.

I. Preparation of various copolymer solutions (C)

The copolymer solutions are prepared in a 4 l stainless steel boiler equipped with a stirrer, reflux condenser and feed inlets. As initial mixture, the solvents and variable amounts of a commercially available mixture of vinyl esters of saturated aliphatic monocarboxylic acids having predominantly 10 carbon atoms which are branched on the α-carbon atom (commercial product VeoVa 10 from Shell) are initially introduced in each case, and the mixture is heated to 170° C. Shellsol® A used as solvent is a commercially available mixture of C$_3$–C$_4$-alkyl substituted aromatics. The viscosity of the copolymer solutions obtained was measured at 23° C. with an ICI cone and plate viscometer.

Copolymer-solution 1

The following are weighed into the boiler and mixed:

271.0 parts of Shellsol® A 300.0 parts of VeoVa 10

The following are weighed into the monomer feed I and mixed:

150.0 parts of methyl methacrylate 210.0 parts of n-butyl acrylate 390.0 parts of hydroxyethyl methacrylate The following are weighed into the monomer feed II and mixed:

450.0 parts of styrene 22.5 parts of mercaptoethanol

The following are weighed into the initiator feed and mixed:

36.0 parts of di-tert.-butyl peroxide 108.0 parts of Shellsol® A

The contents of monomer tank I are evenly metered in over a period 4.5 hours. The contents of monomer tank II are metered in over a period of 4.5 hours at such a rate that during the first 90 minutes 25% of the total amount, from the 91st to the 180th minute of the overall running time 35% of the total amount and in the remaining addition period 40% of the total amount of styrene are metered in. During the addition, the temperature in the boiler is maintained at 165°–170° C. After all feeds have been added, another 3.8 parts of di-tert.-butyl peroxide 11.3 parts of Shellsol® A are metered in from the initiator tank over a period of 1 hour. The polymerization is continued at this temperature for another 2 hours. The non-volatile portion (1 h 130° C.) of this copolymer solution 1 is 80%, and the viscosity of the 60% strength solution in butyl acetate is 4.0 dPaxs.

The content of the free vinyl ester monomer VeoVa 10 in the copolymer solution 1 was determined by gas chromatography. The content of free vinyl ester monomer found was 1.2%. When this converted to the total amount of vinyl ester used and the solids content of copolymer solution 1 is taken into account, the content of unconverted vinyl ester is 7.5%.

Copolymer solution 2

The following are weighed into the boiler and mixed:

251.0 parts of Shellsol® A 300.0 parts of VeoVa 10

The following are weighed into the monomer feed I and mixed:

75.0 parts of methyl methacrylate 225.0 parts of n-butyl acrylate 450.0 parts of acetoacetoxyethyl methacrylate The following are weighed into the monomer feed II and mixed:

450.0 parts of styrene 6.0 parts of mercaptoethanol

The following are weighed into the initiator feed and mixed:

52.6 parts of dicumyl peroxide 122.8 parts of Shellsol® A

The contents of monomer tank I are evenly metered in over a period 4.5 hours. The contents of monomer tank II are metered in over a period of 4.5 hours at such a rate that during the first 90 minutes 25% of the total amount, from the 91st to the 180th minute of the overall running time 35% of the total amount and in the remaining feed time 40% of the total amount of styrene are metered in. During the addition, the temperature in the boiler is maintained at 165°–170° C. After all feeds have been added, another 5.9 parts of dicumyl peroxide 13.7 parts of Shellsol® A are metered in from the initiator tank over a period of 1 hour. The polymerization is continued at this temperature for another 2 hours. The polymer is then dissolved in 277 parts of xylene. The nonvolatile portion (1 h 130° C.) of this copolymer solution 2 is 70%, the viscosity of the solution (60% strength in butylacetate) is 1.30 dPaxs, and the residual free vinyl ester content is 1.2%, relative to copolymer solution 2, which corresponds to 8.78%, relative to the vinyl ester content and the solids content of the solution.

Copolymer solution 3

128 parts of ethyl acetoacetate are added to 770 parts of copolymer solution 1 in a 4 l stainless steel boiler equipped with stirrer and reflux condenser. The solution is kept at 80°–90° C. for 5 hours, the eliminated ethanol is then distilled off at atmospheric pressure at about 115° C. to 165° C. through a distillation apparatus. The remaining ethanol is then distilled off together with Shellsol® A via a vacuum distillation. The polymer is then diluted from the solids content of 81% down to 70% with xylene and down to 65% with n-butylacetate. The copolymer solution 3 thus obtained has a viscosity of 4.4 dPas and a non-volatile portion of 63.5%.

Copolymer solution 4

The following are weighed into the boiler and mixed:

473.0 parts of Shellsol® A 486.0 parts of VeoVa 10

The following are weighed into the monomer feed I and mixed:

194.0 parts of methyl methacrylate 341.0 parts of n-butyl acrylate 680.0 parts of glycidyl methacrylate The following are weighed into the monomer feed II and mixed:

729.0 parts of styrene 12.2 parts of mercaptoethanol

The following are weighed into the initiator feed and mixed:

43.7 parts of di-tert.-butyl peroxide 131.0 parts of Shellsol® A

The contents of monomer tank I are evenly metered in over a period 4.5 hours. The contents of monomer tank II are metered in over a period of 4.5 hours at such a rate that during the first 90 minutes 25% of the total amount, from the 91st to the 180th minute of the overall running time 35% of the total amount and in the remaining addition period 40% of the total amount of styrene are metered in. During the addition, the temperature in the boiler is maintained at 165°–170° C. After all feeds have been added, another 6.1 parts of di-tert.-butyl peroxide 18.5 parts of Shellsol® A are metered in from the initiator tank over a period of 1 hour. The polymerization is continued at this temperature for another 2 hours. The polymer is then dissolved in 443 parts of xylene. The nonvolatile portion (1 h 130° C.) of this copolymer solution 2 is 70%, the viscosity of the solution (60% strength in butylacetate) is 3.10 dPaxs, and the residual free vinyl ester content is 0.83%, relative to copolymer solution 4, which corresponds to 5.9%, relative to the vinyl ester content and the solids content of the solution.

Copolymer solution 5

105.6 parts of acrylic acid, 1 part of p-di-tert.-butylkresol, 0.05 parts of phenothiazine and 0.5 parts of triphenylphosphine are added to 1173 parts of copolymer solution 4 in a 4 l stainless steel boiler equipped with stirrer and reflux condenser. The mixture is stirred at a temperature of 110° C. up to an acid number of 2 mg of KOH/g. Another 5.3 parts of acrylic acid are then added, and stirring at the stated temperature is continued for another 3 hours until an acid number of 2 mg of KOH/g and an epoxide equivalent weight of about 19,000 have been reached. The copolymer solution is brought to a solids content of 60% with butyl acetate. Copolymer solution 5 has a viscosity of 6.8 dPas, measured at 23° C.

Copolymer solution 6

The following are weighed into the boiler and mixed:

336.4 parts of Shellsol® A 360.0 parts of VeoVa 10

The following are weighed into the monomer feed I and mixed:

144.0 parts of ethyl acrylate 360.0 parts of n-butyl acrylate 360.0 parts of maleic anhydride The following are weighed into the monomer feed II and mixed:

540.0 parts of styrene 69.0 parts of tert.-dodecanethiol

The following are weighed into the initiator feed and mixed:

43.2 parts of di-tert.-butyl peroxide 129.6 parts of Shellsol® A

The contents of monomer tank I are evenly metered in over a period of 4.5 hours. The contents of monomer tank II are metered in over a period of 4.5 hours at such a rate that during the first 90 minutes 25% of the total amount, from the 91st to the 180th minute of the overall running time 35% of the total amount and in the remaining addition period 40% of the total amount of styrene are metered in. During the addition, the temperature in the boiler is maintained at 165°–170° C. After all feeds have been added, another 4.5 parts of di-tert.-butyl peroxide 13.5 parts of Shellsol® A are metered in from the initiator tank over a period of 1 hour. The polymerization is continued at this temperature for another 2 hours. The non-volatile portion (1 h 130° C.) of this copolymer solution 6 is 80%, the viscosity of the solution, 60% strength in xylene is 6.20 dPaxs.

Comparative Example

Analogously to the procedure of the technical information in English "VeoVa polymers LR 40 and LR 2041 for water-thinnable paints" of Shell, an acetoacetate-functional copolymer solution was prepared as follows:

147 parts of Solvent Naphtha®, 165 parts of 1-methoxypropyl 2-acetate, 264 parts of a commercially available mixture of vinyl esters of saturated aliphatic monocarboxylic acids having predominantly 10 carbon atoms branched on the α-carbon atom, 60 parts of styrene and 2.4 parts of di-tert.-butyl peroxide were initially introduced into a 4 liter stainless steel boiler equipped with stirrer, reflux condenser and feed inlets, and the mixture was heated to 160° C.

The following are weighed into the monomer tank and mixed:

540.0 parts of styrene 194.4 parts of acetoacetoxyethyl methacrylate 108.0 parts of methyl methacrylate The following were weighed into the initiator tank and mixed:

21.6 parts of tert.-butyl perbenzoate
64.8 parts of Solvent Naphtha®
2.4 parts of dodecanethiol The contents of the monomer and initiator tank are evenly metered in over a period of 4.5 hours, while the temperature is maintained at 155°–160° C. Then over a period of 0.5 h 21.6 parts of acetoacetoxyethyl methacrylate 12.0 parts of methyl methacrylate are then added from the monomer tank and 10.8 parts of solvent naphthas 3.6 parts of tert.-butyl perbenzoate from the initiator tank.

0.5 h after this additional metering in, another 25.2 parts of Solvent Naphtha®
8.4 parts of tert.-butyl perbenzoate are metered in from the initiator tank over a period of 0.5 h. The polymerization is continued for 0.5 h, and the mixture is then dissolved with 253.8 parts of butyl acetate.

The copolymer solution 7 thus obtained has a solids content (1 h 130° C.) of 62.3% and a viscosity of 2.05 dPaxs (50% strength in methoxypropyl acetate) at 23° C. Under the same conditions as with copolymer solution 2, the residual content of free vinyl ester monomers in the 62.3% polymer solution was determined by gas chromatography. A content of 3.45% by weight was found. This corresponds to a residual monomer content of 24% by weight, relative to the total amount of vinyl ester used, taking into account the theoretical solids content of the polymer solution of 65%.

II. Preparation of a ketimine crosslinking agent

A solution of 232 parts of a ketimine prepared from ethyl amyl ketone (5-methyl-3-heptanone) and diethylenetriamine, dissolved in 84 parts of ethyl amyl ketone, is initially introduced into a 2 liter glass boiler. A solution of 228 parts of a trimerized isophorone diisocyanate in 45.6 parts of xylene and 45.6 parts of 1-methoxypropyl 2-acetate is added dropwise to this solution over a period of 120 minutes. The reaction temperature is maintained at 35°–40° C. The mixture is maintained at 35° C. for another 3 hours until no more free isocyanate is detected in the reaction mixture by infrared spectroscopy. 13.0 parts of methoxypropanol are then added. The ketimine solution thus obtained has a solids content of 57% (60 min, 130° C.) and a viscosity of 6.4 dPas (at 23° C.).

EXAMPLE 1

25 parts of copolymer solution 2, 6.75 parts of a commercially alkoxylated tetraacrylate having a number average molecular weight of 560 (tetraacrylate XP 5105 from H. Rahn & Co., Zurich) and 1.19 parts of a 20% strength solution of 1,8-diazabicyclo[5.4.0]undec-7-ene in butyl acetate are mixed, and the mixture is adjusted with butyl acetate to a processing viscosity of 20 s, measured in a DIN 4 viscometer at 23° C. Clearcoat 1 thus obtained is applied to a glass plate in a wet film strength of 100 μm. The coating properties are tested after crosslinking at room temperature, 2 h after vigorous drying (30 min. at 60° C.) and 2 h after baking (30 min. at 100° C.). The hardness of the films is evaluated by means of the pendulum hardness test of König and the degree of crosslinking via the stability to premium gasoline. The stability to premium gasoline is measured by means of a felt disk which is soaked in premium gasoline and placed on the clearcoat and covered for 3 minutes. It is rated on a scale of 0 to 3 in steps of 0.5.

The softening and marking of the coat is evaluated. 0/0 means no marking/no softening. 3/3 means heavy marking/heavy softening.

The following test results are obtained:
Pendulum damping 30 min/100° C. and 3 days at room temperature: 32 s 30 min/60° C. and 3 days at room temperature: 144 s 4 days at room temperature: 98 s Stability to gasoline after 10 days at room temperature: 1/1.

EXAMPLE 2

A clearcoat 2 was prepared analogously to Example 1 by mixing

| | |
|---|---|
| Copolymer solution 2 | 25 parts |
| Copolymer solution 5 | 47.8 parts |
| Triphenylphosphine (20% strength solution in xylene) | 2.3 parts, |

(20% strength solution in xylene) 2.3 parts, and the mixture was adjusted with butyl acetate to a processing viscosity of 20 s, measured in the DIN 4 viscometer at 23° C. Application, curing and testing of the coating are carried out analogously to Example 1. The following test results are obtained:
Pendulum damping 30 min/60° C. and 3 days at room temperature: 132 s 4 days at room temperature: 106 s Stability to gasoline after 7 days at room temperature: 0.5/0.

EXAMPLE 3

Analogously to Example 1, a clearcoat 3 is prepared by mixing 50 parts of copolymer solution 2 and 6.3 parts of the ketimine crosslinking agent described above, and the mixture is adjusted with butyl acetate to a processing viscosity of 20 s, measured in the DIN 4 viscometer at 23° C. Application, curing and testing of the coating are carried out analogously to Example 1. The following test results are obtained:
Pendulum damping 30 min/100° C. and 3 days at room temperature: 80 s 30 min/60° C. and 3 days at room temperature: 87 s 4 days at room temperature: 60 s Stability to gasoline after 10 days at room temperature: 0.5/1.

EXAMPLE 4

Analogously to Example 1, a clearcoat 4 is prepared by mixing 50 parts of copolymer solution 5 and 12.7 parts of the ketimine crosslinking agent and 2.0 parts of a 20% strength solution of 1,8-diazabicyclo[5.4.0]undec-7-ene in butyl acetate described above, and the mixture is adjusted with butyl acetate to a processing viscosity of 20 s, measured in the DIN 4 viscometer at 23° C. Application, curing and testing of the coating are carried out analogously to Example 1. The following test results are obtained:
Pendulum damping 30 min/100° C. and 3 days at room temperature: 193 s 30 min/60° C. and 3 days at room temperature: 105 s 4 days at room temperature: 120 s Stability to gasoline after 5 days at room temperature: 0/0.

We claim:

1. A copolymer (C) prepared by free-radical solution polymerization and containing acidic C—H crosslinkable groups or ethylenically unsaturated double bond crosslinkable groups or epoxy crosslinkable groups or cyclic anhydride crosslinkable groups or isocyanate crosslinkable groups and, optionally, carboxyl groups and/or, optionally, hydroxyl groups and/or, optionally, amino groups, which copolymer is based on vinyl esters, vinyl aromatics, ethylenically unsaturated monomers containing at least one functional group and, optionally, further copolymerizable monomers, wherein copolymer (C) is a copolymer containing on average 1.25 to 30 crosslinkable groups per molecule and an average molecular weight (number average) of 1500 to 6000 and is prepared by (A) synthesizing a copolymer by free-radical solution polymerization at temperatures of 130° to 200° C. of
  $a_1$) 5 to 25% by weight of one or more vinyl esters of monocarboxylic acids,
  $a_2$) 10 to 50% by weight of one or more vinyl aromatic hydrocarbons,
  $a_3$) 10 to 40% by weight of one or more ethylenically unsaturated monomers containing at least one crosslinkable or other functional group, and
  $a_4$) 0 to 40% by weight of other ethylenically unsaturated, copolymerizable monomers, the sum of components $a_1$ to $a_4$ amounting in each case to 100% by weight,
  1.) initially introducing at least 60% by weight of the total amount of component $a_1$,
  2.) metering in components $a_2$ to $a_4$ and any remainder of component $a_1$ over a monomer addition period which is of the same length for all components in such a manner that
    i) the amount of component $a_1$ added per unit of time over the monomer addition period remains constant or decreases,
    ii) the amount of components $a_3$ and $a_4$ added per unit of time over the monomer addition period remains constant,
    iii) the amount of component $a_2$ added over the first third of the monomer addition period is 15 to 30% by weight of the total amount of component $a_2$, the amount added over the second third is 25 to 40% by weight and the amount added over the last third is 35 to 60% by weight of the total amount of component $a_2$, and
(B) the copolymer obtained in step A is optionally reacted with compounds (V) which contain a group which is reactive towards the functional groups of component $a_3$ and at least one crosslinkable group, with the exception of hydroxyl, carboxyl, and amino groups,
in which the crosslinkable groups have been incorporated in copolymer (C) by using, as component $a_3$, ethylenically unsaturated monomers having at least one acidic C—H group or at least one ethylenically unsaturated double bond or at least one epoxy group or at least one cyclic anhydride group or at least one isocyanate group and/or reacting the copolymer obtained in step A with compounds (V) which contain a group which is reactive towards the functional groups of component $a_3$ and at least one acidic C—H group or ethylenically unsaturated double bond or epoxy group or cyclic anhydride group or isocyanate group as crosslinkable groups.

2. A copolymer as claimed in claim 1, which contains on average 2 to 15 crosslinkable groups per molecule.

3. A copolymer as claimed in claim 1, which is prepared by using 10 to 19% by weight of one or more vinyl esters of monocarboxylic acids.

4. A copolymer as claimed in claim 1, wherein one or more vinyl esters of monocarboxylic acids branched at the α position and having 5 to 15 carbon atoms per molecule have been used as component $a_1$.

5. A copolymer as claimed in claim 1, wherein one or more vinyl esters of saturated aliphatic monocarboxylic acids having 9 to 11 carbon atoms which are branched at the α-carbon atom have been used as component $a_1$.

6. A copolymer as claimed in claim 1, which is prepared by using 15 to 35% by weight of component $a_3$.

7. A copolymer as claimed in claim 1, wherein hydroxyalkyl esters of ethylenically unsaturated carboxylic acids have been used as component $a_3$ and compound (V) is selected from the group consisting of ethylenically unsaturated carboxylic acids and the alkyl esters of ethylenically unsaturated carboxylic acids having 1 to 6 carbon atoms in the alkyl radical.

8. A copolymer as claimed in claim 1, wherein hydroxyalkyl esters of ethylenically unsaturated carboxylic acids have been used as component $a_3$ and compound (V) has at least one ethylenically unsaturated double bond and one isocyanato group.

9. A copolymer as claimed in claim 1, wherein hydroxyalkyl esters of ethylenically unsaturated carboxylic acids have been used as component $a_3$ and compound (V) is selected from the group consisting of amides of α,β-unsaturated carboxylic acids containing alkoxymethyl groups and compounds having the general formula $$CH_2=C(R)-C(=O)-N(R^1)-X-COOR^2$$

where

R is H or $CH_3$,

R1 is H, alkyl, or aryl,

R2 is alkyl, and $$X \text{ is } -C(=O)-, -CH(R^1)-, -CH(OR^1)-, \text{ or } -CH(COOR^1)- .$$

10. A copolymer as claimed in claim 1, wherein hydroxyalkyl esters of ethylenically unsaturated carboxylic acids have been used as component $a_3$ and compound (V) contains a COOH or alkyl ester group having 1 to 6 carbon atoms in the alkyl radical and at least one active hydrogen atom.

11. A copolymer as claimed in claim 1, wherein epoxy-containing ethylenically unsaturated monomers have been used as component $a_3$ and compound (V) contains at least one ethylenically unsaturated double bond and one carboxyl or amino group.

12. A copolymer as claimed in claim 1, wherein isocyanato-containing ethylenically unsaturated monomers have been used as component $a_3$ and compound (V) contains at least one ethylenically unsaturated double bond and one OH, NH, SH, or COOH group.

13. A copolymer as claimed in claim 1, wherein alkyl esters or aminoalkyl esters of ethylenically unsaturated caoboxylic acids having 1 to 6 carbon atoms in the alkyl radical have been used as component $a_3$ and compound (V) contains at least one ethylenically unsaturated double bond and one OH, NH, or SH group.

14. A copolymer as claimed in claim 1, wherein ethylenically unsaturated carboxylic acids have been used as component $a_3$ and compound (V) contains at least one ethylenically unsaturated double bond and one OH, NH, SH, NCO, or epoxy group.

15. A copolymer as claimed in claim 1, wherein acetoacetato-containing monomers have been used as component $a_3$.

16. A copolymer as claimed in claim 1, wherein amides of α,β-unsaturated carboxylic acids containing alkoxymethyl groups or compounds having the general formula

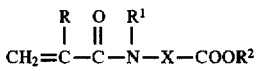

where

R is H or $CH_3$,

R1 is H, alkyl, or aryl,

R2 is alkyl, and $$X \text{ is } -\underset{\underset{O}{\|}}{C}-, -\underset{\underset{R^1}{|}}{CH}-, -\underset{\underset{OR^1}{|}}{CH}-, \text{ or } -\underset{\underset{COOR^1}{|}}{CH}- .$$

17. A copolymer as claimed in claim 16, wherein compound (V) contains at least one ethylenically unsaturated couble bond and one OH, NH, or SH group.

18. A process for the preparation of the copolymer as claimed in claim 1 by free-radical solution polymerization, which comprises A) reacting monomers $a_1$ to $a_4$ at temperatures of 130° to 200° C. by free-radical solution polymerization to give a copolymer (A), in which
1.) at least 60% by weight of the total amount of component $a_1$ ia initially introduced,
2.) component $a_2$ to $a_4$ and any remainder of component $a_1$ are metered in over a monomer addition period which is of the same length for all components in such a manner that
   i) the amount of component $a_1$ added per unit of time over the monomer addition period remains constant or decreases,
   ii) the amount of components $a_3$ and $a_4$ added per unit of time over the monomer addition period remains constant,
   iii) the amount of component $a_2$ added over the first third of the monomer addition period is 15 to 30% by weight of the total amount of component $a_2$, the amount added over the second third is 25 to 40% by weight, and the amount added over the last third is 35 to 60% by weight of the total amount of component $a_2$, and B) optionally reacting the copolymer obtained in step A with compounds (V) which contain a group which is reactive towards the functional groups of component $a_3$ and contain at least one crosslinkable group, with the exception of hydroxyl, carboxyl, and amino groups, in which the crosslinkable groups have been incorporated in copolymer (C) by using, as component $a_3$, ethylenically unsaturated monomers having at least one acidic C—H group or at least one ethylenically unsaturated double bond or at least one epoxy group or at least one cyclic anhydride group or at least one isocyanate group and/or reacting the copolymer obtained in step A with compounds (V) which contain a group which is reactive towards the functional groups of component $a_3$ and at least one acidic C—H group or ethylenically unsaturated double bond or epoxy group or cyclic anhydride group or isocyanate group as crosslinkable groups.

19. The process as claimed in claim 18, wherein 100% by weight of the total amount of component $a_1$ is initially introduced.

20. The process as claimed in claim 18, wherein the monomers are polymerized at temperatures of 150° to 180° C.

21. A coating agent which contains copolymer (C) containing crosslinkable groups as claimed in claim 1 as binder.

* * * * *